United States Patent

Straub

[15] 3,679,883

[45] July 25, 1972

[54] FULL ADDER

[72] Inventor: Dieter Straub, Constance, Germany

[73] Assignee: Telefunken Patentverwertungsgesellschaft, Ulm/Danube, Germany

[22] Filed: Nov. 16, 1970

[21] Appl. No.: 89,859

[30] Foreign Application Priority Data

Nov. 14, 1969 Germany ......................P 19 57 302.5

[52] U.S. Cl. ...............................235/175, 235/173, 235/168

[51] Int. Cl. ........................................G06f 7/385, G06f 7/50

[58] Field of Search .................................235/168, 173, 175

[56] References Cited

UNITED STATES PATENTS

| | | | |
|---|---|---|---|
| 3,584,207 | 6/1971 | Avsan et al. | 235/175 |
| 3,584,205 | 6/1971 | Malaby et al. | 235/175 X |
| 3,566,098 | 2/1971 | Kono | 235/175 |
| 3,548,182 | 12/1970 | Pross | 235/175 X |
| 3,465,133 | 9/1969 | Booher | 235/175 |
| 3,454,751 | 7/1969 | Brastins et al. | 235/175 X |
| 3,202,806 | 8/1965 | Menne | 235/168 X |

*Primary Examiner*—Eugene G. Botz
*Assistant Examiner*—James F. Gottman
*Attorney*—Spencer & Kaye

[57] ABSTRACT

A full adder composed essentially of six identical logic circuits each arranged to receive inputs A1, A2 . . . B1, B2... and to produce outputs $C = A1 + A2... + \overline{B1 + B2...}$ and $\overline{C} = \overline{A1 + A2...}\,(B1 + B2...)$, the logic circuits being arranged to receive addend input values $X_i$ and $Y_i$ and carry inputs $Z_{i-1}$, and their complements, and being arranged in at least two groups of circuits, the first group producing an output carry signal and the second group receiving inputs from the first group and producing an output sum signal.

8 Claims, 5 Drawing Figures

Inventor:
Dieter Straub
BY Spencer & Kaye
ATTORNEYS

FULL ADDER

BACKGROUND OF THE INVENTION

The present invention relates to a full adder composed of a relatively small number of identical logic circuits.

The invention is directed to a full adder which forms the sum $$S_i = X_i \oplus Y_i \oplus (Z_{i-1}) \text{ and the output carry}$$

$$Z_i = (X_i \cdot Y_i) + (X_i \cdot Z_{i-1}) + (Y_i \cdot Z_{i-1})$$

$\oplus$ representing a modulo-2 addition, + the logic OR function and $\cdot$ the logic AND function, the formation of the output carry requiring less time than the sum formation. Such full adders are known and permit rapid processing of carries passing through.

SUMMARY OF THE INVENTION

It is the object of the present invention to construct an improved full adder with the use of logic circuits, particularly of the type disclosed in U.S. Pat. No. 3,504,192, issued to Herbert Stopper on Mar. 31st, 1970, which have at least one first input (A1, A2,. . .) and at least one second input (B1, B2,. . .) and which link the input values fed to these inputs to form the following output values:

$$C = A1 + A2 + \ldots . + \overline{B1 + B2 + \ldots}$$

$$\overline{C} = \overline{A1 + A2 + \ldots} \cdot (B1 + B2 + \ldots)$$

The present invention consists in that the addends $X_i$, $Y_i$ and their complements $\overline{X_i}$, $\overline{Y_i}$ are fed to a total of four inputs of a first group of logic circuits which form first output values $X_i + Y_i$, $\overline{X_i} + \overline{Y_i}$, $\overline{X_i \cdot Y_i}$, $X_i \cdot Y_i$; that a second group of the logic circuits forms, from at least two of the first output values and from the input carry $Z_{i-1}$ and its complement $\overline{Z_{i-1}}$, the output carry $Z_i$ and second output values; and that a logic circuit forms the sum $S_i$ from two of the second output values.

DESCRIPTION OF THE PREFERRED EMBODIMENTS

Figure 1A:
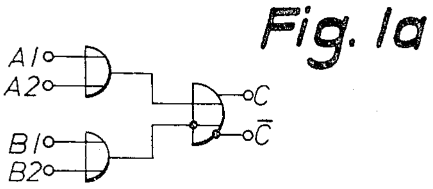
FIG. 1*a* is a block circuit diagram of a basic logic circuit employed in circuits according to the invention.
Figure 1B:
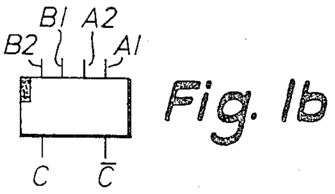
FIG. 1*b* is a simplified symbolic representation of the circuit of FIG. 1*a*.

A logic circuit which links input values A and B into output values $C = A + \overline{B}$ and $\overline{C} = \overline{A} \cdot B$, where the input value A can be replaced by the disjunctively linked values A1, A2 . . . and the input value B can be replaced by the disjunctively linked values B1, B2 . . . so that the previously mentioned linkage equations result, is disclosed in the above-mentioned U.S. Pat. No. 3,504,192. The logic circuit diagram of such a circuit having at least four inputs A1, A2, B1, B2 is shown in FIG. 1*a*. FIG. 1*b* shows a simplified symbol for the circuit shown in FIG. 1*a* which will be used in illustrating circuits according to the invention.

In terms of logic function, the circuit of FIGS. 1*a* and 1*b* consists of two OR gates each receiving all of the A or B inputs and an ORNOT gate having its direct input connected to the A-input gate and its negated input connected to the B-input date. The ORNOT gate has a direct output C and a complementary output $\overline{C}$. The logic circuit could also be considered as an OR gate receiving inputs A, a NOR gate receiving inputs B, and an OR gate receiving the outputs of the first two gates and having a direct function output and a complementary, or negated, function output.

Figure 2:
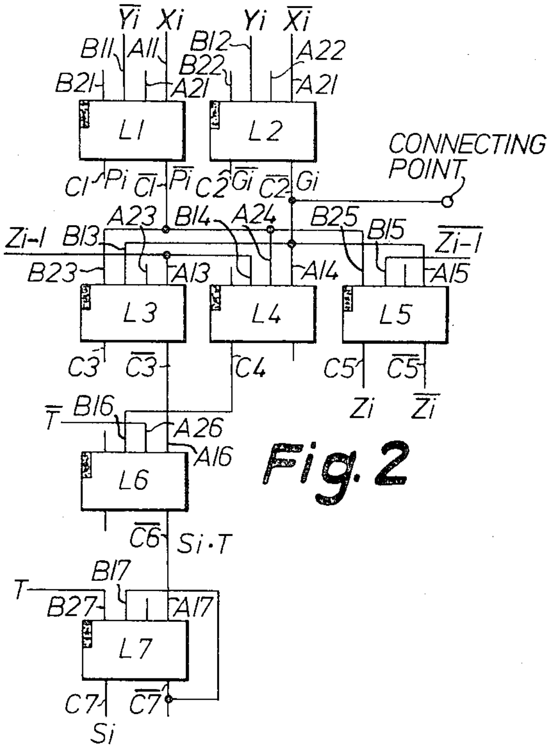
FIG. 2 is a schematic diagram, using the symbolic representation of FIG. 1*b*, of one embodiment of a full adder according to the present invention.

FIG. 2 shows one stage of one preferred embodiment of the full adder according to the present invention. The index *i* indicates the bit location; a higher value of *i* corresponds to a higher bit location. The full adder of FIG. 2 contains seven logic circuits L1 to L7 each identical with the circuit of FIG. 1; however, only logic circuits L1 to L6 will initially be discussed below. The individual logic circuits each have four inputs A1, A2, B1, B2. The interconnection of the logic circuits and the association of input and output signal values with the inputs $A1\mu$, $A2\mu$, $B1\mu$, $B2\mu$, where $\mu = 1 \ldots 6$ and corresponds to the logic circuit reference numeral, and outputs $C\mu$, $\overline{C\mu}$ is accomplished as follows:

Circuit L1: $A11 = X_i$; $B11 = \overline{Y_i}$

Circuit L2: $A12 = \overline{X_i}$; $B12 = Y_i$

Circuit L3: $A13 = X_{i-1}$; $B13 = \overline{C2}$; $B23 = \overline{C1}$

Circuit L4: $A14 = \overline{C2}$; $A24 = \overline{C1}$; $B14 = Z_{i-1}$

Circuit L5: $A15 = \overline{C2}$; $B15 = \overline{Z_{i-1}}$; $B25 = \overline{C1}$; $C5 = Z_i$ $$\overline{C5} = \overline{Z_i}$$

Circuit L6: $A16 = \overline{C3}$; $B16 = C4$; $C6 = \overline{S_i}$; $\overline{C6} = S_i$ The following logic values are then available at the individual outputs of the logic circuits:

$C1 = X_i + Y_i = P_i$ $\overline{C1} = \overline{X_i} \cdot \overline{Y_i} = \overline{P_i}$ $C2 = \overline{X_i} + \overline{Y_i} = \overline{G_i}$ $\overline{C2} = X_i \cdot Y_i = G_i$ $C3 = Z_{i-1} + (C1 \cdot C2)$ $\overline{C3} = \overline{Z_{i-1}} \cdot (\overline{C1} + \overline{C2}) = [(\overline{X_i} \cdot \overline{Y_i}) + (X_i \cdot Y_i)] \cdot \overline{Z_{i-1}}$ $C4 = \overline{C2} + \overline{C1} + \overline{Z_{i-1}}$ $\overline{C4} = C2 \cdot C1 \cdot Z_{i-1} = (\overline{X_i} + \overline{Y_i}) \cdot (X_i + Y_i) \cdot Z_{i-1}$ $C5 = \overline{C2} + (C1 \cdot Z_{i-1}) = (X_i \cdot Y_i) + [Z_{i-1} \cdot (X_i + Y_i)] = Z_i$ $\overline{C5} = C2 \cdot (\overline{C1} + \overline{Z_{i-1}}) = \overline{Z_i}$ $$C6 = \overline{C3} + \overline{C4} = [(X_i \cdot Y_i) + (\overline{X_i} \cdot \overline{Y_i})] = \overline{Z_{i-1}} + [(X_i + Y_i) \cdot (\overline{X_i} + \overline{Y_i}) \cdot Z_{i-1}] = \overline{S_i}$$

$$\overline{C6} = C3 \cdot C4 = S_i$$

For producing the above values it is assumed that the value fed to input A2 of logic circuit L6, i.e. input A26, is $\overline{T} = 0$, where T is a clock pulse value and $\overline{T}$ is its complement, or inverted value. The logic values appearing at outputs C1, $\overline{C1}$, C2, $\overline{C2}$ are represented by the abbreviated symbols $P_i$, $\overline{P_i}$, $\overline{G_i}$, $G_i$, respectively.

The carry $Z_i$ requires less time for its information in this full adder than the sum $S_i$ inasmuch as the carry of the previous stage, or more exactly speaking its complement $\overline{Z_{i-1}}$, must pass through only one logic circuit before the carry $Z_i$ of the present stage is formed. At the output $\overline{C6}$ the sum $S_i$ for the stage is available.

Since the full adder operates asynchronously, i.e. without the addition of a clock pulse, it will be advisable in many cases to provide a memory in which the value of sum $S_i$ can be stored. For this purpose a further logic circuit L7 is provided having its input A17 connected with the output $\overline{C6}$, its input B17 connected with its output $\overline{C7}$, and its input B27 receiving a clock pulse signal T. At the same time, the inverted clock pulse signal $\overline{T}$ is fed to input A26 of logic circuit L6.

With this arrangement, signal $S_i T$ is available at output $\overline{C6}$. Upon the occurrence of a clock pulse T, this signal is transferred into the flipflop formed by logic circuit L7, at whose output C7 it is available for the duration of the clock pulse and during the subsequent clock pulse interval. The connection of a circuit such as logic circuit L7 as such a flipflop is also disclosed in U.S. Pat. No. 3,504,192, at column 4, line 73, to column 5, line 2.

Figure 3:
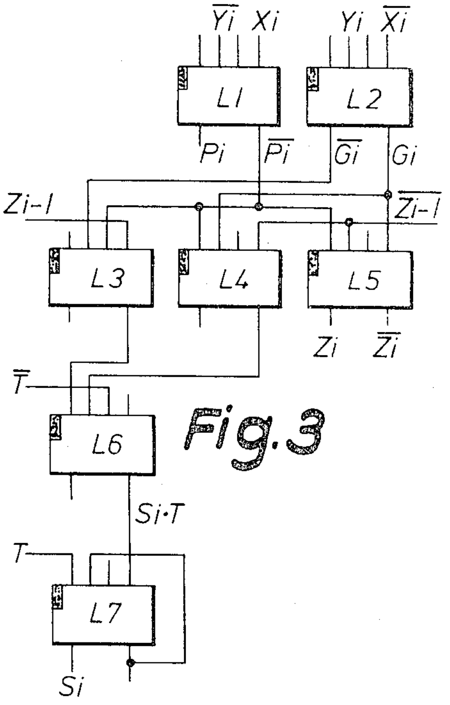
FIG. 3 is a view similar to that of FIG. 2 of another embodiment of a full adder according to the present invention.

FIG. 3 shows another embodiment of the full adder according to the present invention which is constructed in a manner similar to that of the circuit of FIG. 2 of six logic circuits L1 to L6 and a logic circuit L7 connected to act as a flipflop. Here, too, the values $P_i$, $\overline{P_i}$, $\overline{G_i}$, $G_i$ are available at the outputs of the logic circuits L1 and L2. The interconnection of logic circuits L1 to L6 and the association of input values and output values with the inputs and outputs is accomplished in the following manner:

Circuit L1: $A11 = X_i$; $B11 = \overline{Y_i}$

Circuit L2: $A12 = \overline{X_i}$; $B12 = Y_i$

Circuit L3: $A13 = Z_{i-1}$; $A23 = \overline{C1}$; $B13 = C2$

Circuit L4: $A14 = \overline{Z_{i-1}}$; $B14 = \overline{C2}$; $B24 = \overline{C1}$ Circuit L5: $A15 = \overline{C2}$; $B15 = \overline{Z_{i-1}}$; $B25 = \overline{C1}$ Circuit L6: $A26 = \overline{T}$; $B16 = \overline{C4}$; $B26 = \overline{C3}$ $C5 = Z_i$; $\overline{C5} = \overline{Z_i}$; $C6 = \overline{S_i}$; $\overline{C6} = S_i$ At the individual outputs of the logic circuits the following values are available ($\overline{T}$ is again assumed to be 0):

$$C1 = X_i + Y_i = P_i$$

$$\overline{C1} = \overline{X_i} \cdot \overline{Y_i} = \overline{P_i}$$

$$C2 = \overline{X_i} + \overline{Y_i} = \overline{G_i}$$

$$\overline{C2} = X_i \cdot Y_i = G_i$$

$$C3 = \overline{C1} + C2 + Z_{i-1}$$

$$\overline{C3} = C1 \cdot C2 \cdot \overline{Z_{i-1}}$$

$$C4 = \overline{Z_{i-1}} + (C1 \cdot C2)$$

$$\overline{C4} = Z_{i-1} \cdot (\overline{C1} + \overline{C2})$$

$$C5 = \overline{C2} + (Z_{i-1} \cdot C1) = X_i \cdot Y_i + (X_i + Y_i) \cdot Z_{i-1} = Z_i$$

$$\overline{C5} = C2 \cdot (\overline{Z_{i-1}} + \overline{C1}) = \overline{Z_i}$$

$$C6 = C3 \cdot C4 = \overline{S_i}$$

$$\overline{C6} = \overline{C3} + \overline{C4} = X_i \cdot \overline{Y_i} \cdot \overline{Z_{i-1}} + \overline{X_i} \cdot Y_i \cdot \overline{Z_{i-1}} + \overline{X_i} \cdot \overline{Y_i} \cdot Z_{i-1} + X_i \cdot Y_i \cdot Z_{i-1} = S_i$$

As regards the speed of the carry formation and the transfer of sum $S_i$ into the memory formed by logic circuit L7, the same applies as that stated with respect to the full adder of FIG. 2.

The logic circuits may be constructed in different ways. Advantageously the circuits are constructed in the manner disclosed in U.S. Pat. No. 3,504,192. One such circuit is illustrated herein in FIG. 4 and includes two transistors T1 and T2 which are connected in a current conducting manner with their emitters connected via a source of current I to one terminal of a voltage supply source providing a voltage -U and their collector resistors R1 connected to the other terminal of the voltage supply source. Connected in series with the control circuit of the one transistor T2 is a voltage source having a lower voltage than the voltage swing of the control signals applied to the transistors, i.e. the voltage swing between the logic values 0 and 1, the voltage provided by the series-connected voltage source preferably being one-half of such control signal voltage swing.

Figure 4:
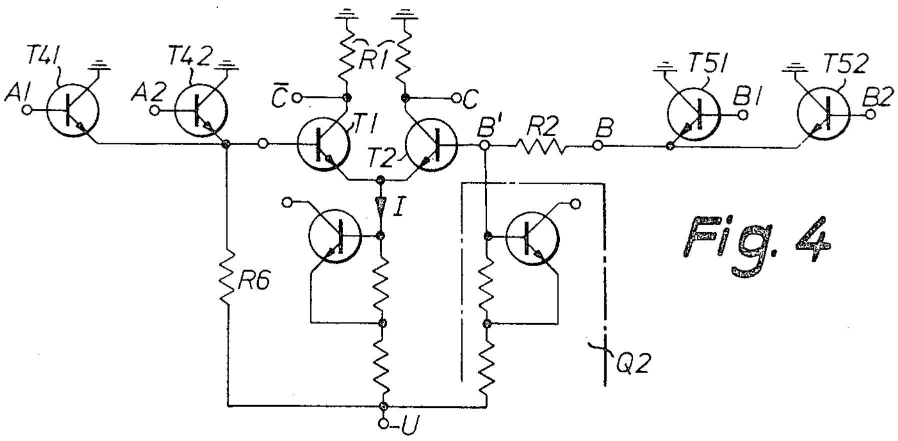
FIG. 4 is a schematic diagram of a practical embodiment of the logic circuit of FIG. 1*a* which is known, per se.

The voltage source which is connected in series with the control circuit of transistor T2 is represented in FIG. 4 by a resistor R2 and a current source circuit Q2 which produces a current of such an amplitude to flow through resistor R2 that the desired voltage drop is produced therein. The inputs of the circuit are A1, A2, B1 and B2 and the outputs of the circuit are C and $\overline{C}$. A more detailed description of this circuit can be found in U.S. Pat. No. 3,504,192, the circuit itself being illustrated in FIG. 8*a* of that patent.

A plurality or all of the logic circuits required for the construction of the full adder may be accommodated in a single integrated circuit. It is here advantageous to bring one or a plurality of the values $P_i$, $\overline{P_i}$, $G_i$, $\overline{G_i}$ to individual connecting points where they can be tapped and are available for other logic connections.

The unused inputs of the logic circuit of FIGS. 2 and 3 are connected, depending on the circuit system employed, to a voltage corresponding to logic 0 or are left unconnected. The latter is possible in the circuit of FIG. 4 where the level corresponding to logic 1 is 0 volt and the level corresponding to logic 0 is a negative voltage.

It will be understood that the above description of the present invention is susceptible to various modifications, changes and adaptations and the same are intended to be comprehended within the meaning and range of equivalents of the appended claims.

What is claimed is:

1. A binary full adder which forms the output sum $$S_i = X_i \oplus Y_i \oplus Z_{i-1}$$

and the output carry $$Z_i = X_i \cdot Y_i + X_i \cdot Z_{i-1} + Y_i \cdot Z_{i-1}$$

from received values $X_i$, $\overline{X_i}$, $Y_i$, $\overline{Y_i}$, $Z_{i-1}$ and $\overline{Z_{i-1}}$, the formation of the output carry taking less time than the output sum formation, said adder comprising a plurality of logic circuits each having a plurality of first inputs A1, A2 ..., a plurality of second inputs B1, B2..., a direct function output C and a corresponding negated function output $\overline{C}$, and linkage means interconnecting said inputs and said outputs for establishing the relationships:

$$C = A1 + A2... + \overline{B1 + B2...}$$

$$\overline{C} = \overline{A1 + A2...} \cdot (B1 + B2...)\text{, wherein}$$

there is a first group of said logic circuits having a total of four of their said inputs connected to each to receive a respective one of the values $X_i$, $Y_i$, $\overline{X_i}$ and $\overline{Y_i}$ and arranged for producing at each of four of their said outputs a respective one of first output values $X_i + Y_i$, $\overline{X_i} + \overline{Y_i}$, $\overline{X_i} \cdot \overline{Y_i}$ and $X_i \cdot Y_i$;

there is a second group of said logic circuits having inputs connected to two of said outputs of said first group and other inputs connected to receive the values $Z_{i-1}$ and $\overline{Z_{i-1}}$ and arranged for producing the output carry $Z_i$ at the output of one of said logic circuits of said second group and a plurality of second output values which are functions of $X_i$, $Y_i$ and $Z_{i-1}$ at selected outputs of said logic circuits of said second group; and a further one of said logic circuits has inputs connected to receive the second output values for producing the output sum $S_i$ at one of its outputs.

2. An arrangement as defined in claim 1 wherein said first and second groups of logic circuits and said further logic circuit consist of a total of not more than six of said logic circuits.

3. An arrangement as defined in claim 2 wherein said first and second groups and said further logic circuit consist of six logic circuits $L\mu$, where $\mu$ is 1, 2, 3, 4, 5 or 6 for each respective logic circuit, each of said logic circuits having two first inputs $A1\mu$ and $A2\mu$, two second inputs $B1\mu$ and $B2\mu$ and two outputs $C\mu$ and $\overline{C\mu}$, said inputs and outputs of said six logic circuits being connected as follows:

$A11 = X_i$; $B11 = \overline{Y_i}$;

$A12 = \overline{X_i}$; $B12 = Y_i$;

$A13 = Z_{i-1}$; $B13 = \overline{C2}$; $B23 = \overline{C1}$;

$A14 = \overline{C2}$; $B14 = Z_{i-1}$; $A24 = \overline{C1}$;

$A15 = \overline{C2}$; $B15 = \overline{Z_{i-1}}$; $B25 = \overline{C1}$;

$A16 = \overline{C3}$; $B16 = C4$ $Z_i = C5$; $\overline{Z_i} = \overline{C5}$; $S_i = \overline{C6}$; $\overline{S_i} = C6$

4. An arrangement as defined in claim 2 wherein said first and second groups and said further logic circuit consist of six logic circuits $L\mu$, where $\mu$ is 1, 2, 3, 4, 5, or 6 for each respective logic circuit, each said logic circuit having two first inputs $A1\mu$ and $A2\mu$, two second inputs $B1\mu$ and $B2\mu$ and two outputs $C\mu$ and $\overline{C\mu}$, said inputs and outputs of said six logic circuits being connected in the following manner:

$$A11 = X_i; \quad B11 = \overline{Y_i}$$
$$A12 = \overline{X_i}; \quad B12 = Y_i$$
$$A13 = Z_{i-1}; \quad B13 = C2 \quad A23 = \overline{C1}$$
$$A14 = \overline{Z_{i-1}}; \quad B14 = \overline{C2} \quad B24 = \overline{C1}$$
$$A15 = \overline{C2}; \quad B15 = \overline{Z_{i-1}} \quad B25 = \overline{C1}$$
$$B16 = \overline{C4} \quad B26 = \overline{C3}$$
$$Z_i = C5; \quad \overline{Z_i} = \overline{C5}; \quad S_i = \overline{C6}; \quad \overline{S_i} = C6$$

5. An arrangement as defined in claim 1 wherein there is an additional one of said logic circuits having one of its inputs connected to that one of said outputs of said further logic circuit providing the output sum $S_t$, said output $\overline{C}$ of said additional logic circuit being connected to one of said second inputs of said additional logic circuit, another second input of said additional logic circuit being connected to receive a train of clock pulses, and a first input of said further logic circuit, to which input no other signal is applied, is connected to receive a train of pulses constituting the complement of said clock pulses.

6. An arrangement as defined in claim 1 wherein each of said logic circuits comprises two transistors, the emitters of which are connected together and are also connected through a current supply circuit to the one pole of a voltage supply source and the collector resistors of which are connected to the other pole of said voltage supply source, and a voltage source connected in series with the control circuit of one said transistor, said voltage source producing a voltage which is lower than the voltage swing of the control signal supplied to said transistors.

7. An arrangement as defined in claim 1 wherein said adder is constructed according to integrated circuit techniques and at least several of said logic circuits are contained in a unitary integrated circuit.

8. An arrangement as defined in claim 1 further comprising at least one externally available connecting terminal to which one of said four outputs of said first group of logic circuits is connected for permitting its associated one of said first output values to be applied to an external circuit.

* * * * *